United States Patent Office 3,400,092
Patented Sept. 3, 1968

3,400,092
COATING COMPOSITIONS CONTAINING PARAFFIN WAX, ETHYLENE-VINYL ACETATE COPOLYMER, AND FISCHER-TROPSCH WAX
Richard C. Fox, San Rafael, Calif., assignor to Chevron Research Corporation, a corporation of Delaware
No Drawing. Filed Dec. 11, 1964, Ser. No. 417,814
3 Claims. (Cl. 260—28.5)

ABSTRACT OF THE DISCLOSURE

Coating composition having improved gloss retention and resistance to blocking and picking consisting essentially of from 45 to 89.9% by weight of a petroleum wax, from 5 to 50% by weight of a copolymer of ethylene and vinyl acetate, and from 0.1 to 15% by weight of a Fischer-Tropsch wax having an average molecular weight between about 750 and 1,000.

---

This invention relates to wax base coating compositions which display superior gloss retention and resistance to blocking and picking. More particularly, it is concerned with compositions comprising a petroleum wax, an ethylene-vinyl acetate copolymer and an additive especially effective in improving the gloss retention ability of the compositions.

It has long been common practice to employ wax and wax-based compositions to coat such articles of commerce as paper, paper board milk cartons, food, cardboard, etc. The coatings are applied to render containers moisture-proof and thus adapted to hold liquids or liquid-containing materials. In addition to the water-resistant property of the coatings, other highly important characteristics which the coatings should possess are high tensile strength and high gloss, which lends an attractive appearance to the coated articles.

It is known that the addition of copolymers of ethylene and vinyl acetate to petroleum waxes results in coating compositions of high tensile strength and ductility. U.S. Patent 2,877,196 discloses such compositions containing from about 0.1 to about 20% by weight of the copolymers. Even higher amounts of the copolymers have been employed with quantities as high as 50% by weight being used. Especially effective coatings are those that contain about 30% by weight of an ethylene-vinyl acetate copolymer. However, it has been found that the compositions, especially when the wax base is employed, is a middle melting point range wax, e.g., 140–170° F. (A.M.P.) melting point, tend to display a significant loss of initial gloss when coated materials are stored. For example, dairy container materials, bread wrappings, etc., are often stored for considerable periods before use. It is thus highly important for appearance that the high gloss of the coating be retained during the storage period. This gloss diminution is especially significant in the materials containing about 30% of the ethylene-vinyl acetate copolymers, however, the problem arises also with compositions in which the copolymers are present in a wide range, i.e., 5 to 45%, by weight.

It has now been found that wax-based coatings possessing high gloss retention and excellent blocking and picking characteristics can be prepared by the use of compositions comprising from 45 to 89.9% by weight of a paraffin wax having a melting point in the range of 140–170° F. A.M.P., from 5 to 50% by weight of a copolymer of ethylene and vinyl acetate and from 0.1 to 15% by weight of a Fischer-Tropsch wax having an average molecular weight between about 750 and 1,000.

The ethylene-vinyl acetate copolymers of U.S. Patent 2,877,196, previously cited, have a polymerized vinyl acetate content of from about 5% to 25% by weight. Copolymers containing vinyl acetate contents without that range also may be employed, for example, a copolymer having a vinyl acetate content of about 25% is marketed and is in common use in wax-based coatings.

The Fischer-Tropsch waxes which are employed as gloss-improving agents are waxes synthesized by the familiar Fischer-Tropsch process. In this process, coal is burned in a steam-oxygen atmosphere to produce hydrogen and carbon monoxide, which substances are then reacted in the presence of a catalyst to produce the desired hydrocarbon wax, e.g., Fischer-Tropsch wax. These waxes are employed in the coating compositions in amounts sufficient to enhance the gloss retention characteristics of the coatings. Amounts of from 0.1 to 15% by weight have been found to be generally sufficient; amounts of from 3 to 5% by weight are preferred.

The waxes which are employed in the compositions of this invention are petroleum waxes, and more preferably, predominantly paraffin waxes. The waxes should melt in the range of 140–170° F. A.M.P. More preferably, the waxes should melt in a range of 145–165° F. A.M.P. Waxes melting below about 145° F. show a poor gloss retention, and waxes melting above 165° F. tend to have a much higher gloss retention factor than the 145–165° F. waxes.

The following examples illustrate the wax-based coating compositions which are employed in this invention. The examples are, of course, nonlimiting.

Example I

In these tests, panels from half-gallon milk cartons were coated with the wax blends. The wax employed was one having a melting point of about 144° F. A.M.P. The Fischer-Tropsch wax used was one having a molecular weight range of 750 to 1,000. The temperature of the coatings at time of coating was 240–280° F. After coating, the panels were dipped into 40° F. water. Then, one of each set was placed into a constant humidity box maintained at 73° F. and one each of the other set placed into a constant heat box maintained at 115° F. Gloss readings were taken of the samples at intervals, employing a Gardner gloss meter with a standard setting of 100. The data from these tests is compiled in Table I following:

TABLE I

| Sample No. | Ethylene-Vinyl acetate, Percent | Fischer-Tropsch Wax, Percent | Exposure Temp., ° F. | Days | | | | | | | | | | | | | | | | | | | |
|---|---|---|---|---|---|---|---|---|---|---|---|---|---|---|---|---|---|---|---|---|---|---|---|
| | | | | 1 | 2 | 3 | 3 | 5 | 6 | 7 | 8 | 9 | 10 | 11 | 12 | 13 | 14 | 15 | 16 | 17 | 18 | 19 | 20 | 21 | + |
| | | | | Gloss after Exposure | | | | | | | | | | | | | | | | | | | | | |
| 1 | 30 | 10 | 73 | 67 | 63 | | 77 | | 74 | 75 | | 76 | | 75 | | | 75 | | | | | | | |
| | | | | 60 | 66 | | 82 | | 80 | 82 | | 85 | | 82 | | | 80 | | | | | | | |
| | | | 115 | 56 | 61 | | 72 | | 67 | 60 | | 62 | | 65 | | | 80 | | | | | | | |
| | | | | 80 | 76 | | 81 | | 74 | 75 | | 75 | | 75 | | | 73 | | | | | | | |

As shown by the data of Table I, the Fischer-Tropsch waxes improve the gloss retention of the compositions without significant lowering of the initial gloss levels.

Example II

In addition to the increase in gloss retention levels, an increase in seal strength, blocking and picking temperature results from the addition of the additives of this invention.

In the following tests, paper strips were coated with wax blends, and blocking points and picking points of the compositions were determined. The blocking and picking points were ascertained by the method of ASTM D1465-57T with samples being run in duplicate. In general, the points are measures of the tendency of slabs of wax-coated papers to adhere to each other. The picking point is the temperature at which the first film disruption occurs on the waxed paper. The blocking point is the temperature at which 50% of the film is disrupted.

The waxes which were tested were paraffin waxes as indicated in the table; the additives are the same as employed in Example I with the Fischer-Tropsch wax of Example II indicated as G.

of this invention to wax-ethylene vinyl acetate compositions.

Other additives common to wax coatings, such as oxidation inhibitors, etc., may be employed in the composition of this invention.

I claim:

1. A composition of matter consisting essentially of from 45 to 89.9% by weight of a paraffin wax having an average melting point in the range of 140 to 170° F. A.M.P., from 5 to 50% by weight of a copolymer of ethylene and vinyl acetate having a vinyl acetate content between about 5 and 25%, and from 3 to 15% by weight of a Fischer-Tropsch wax having an average molecular weight between about 750 and 1,000.

2. The composition of claim 1 wherein the paraffin wax has an average melting point in the range of 145–165° F. A.M.P.

| Wax | Wax, percent | Ethylene-Vinyl Acetate, percent | Additive | Additive, percent | Blocking Point, °F. | Picking Point, °F. |
|---|---|---|---|---|---|---|
| I (155° F. A.M.P.) | 70 | 30 | | | 144.7 / 143.5 | 135.6 / 131.5 |
| | 66.5 | 28.5 | G | 5 | 155 / 155.3 | 143 / 155 |
| 143/150 A.M.P. Wax | 70 | 30 | | | 101.7 / 107.6 | (¹) / 104.2 |
| | 66.5 | 28.5 | G | 5 | 131.2 / 110.7 | 108 / 109 |
| 160/165 A.M.P. Wax | 70 | 30 | | | 148.7 | 137 / 132.4 |
| | 66.5 | 28.5 | G | 5 | 160 / 159 | 143 / 142 |

¹ Total (tore at room temperature).

Thus, these data show that, in addition to gloss retention improvements, a marked increase in blocking and picking points results from the addition of the additives 3. The composition of claim 1 wherein the copolymer of ethylene and vinyl acetate is present in an amount of 25 to 35% by weight.

References Cited

UNITED STATES PATENTS

| | | | |
|---|---|---|---|
| 3,102,040 | 8/1963 | Williams et al. | 106—270 |
| 3,175,986 | 3/1965 | Apikos et al. | 260—28.5 |
| 3,189,573 | 6/1965 | Oken | 260—28.5 |
| 3,215,657 | 11/1965 | Beresniewicz et al. | 260—28.5 |

OTHER REFERENCES

Warth: Chemistry and Technology of Waxes, 2d edition, Reinhold Pub. Corp., N.Y., 1956, pp. 791–792.

MORRIS LIEBMAN, *Primary Examiner.*

B. A. AMERNICK, *Assistant Examiner.*